(12) United States Patent
Yasin et al.

(10) Patent No.: US 9,829,957 B2
(45) Date of Patent: *Nov. 28, 2017

(54) PERFORMANCE SCALABILITY PREDICTION

(71) Applicant: Intel Corporation, Santa Clara, CA (US)

(72) Inventors: Ahmad Yasin, Haifa (IL); Nir Rosenzweig, Givat Ella (IL); Eliezer Weissmann, Haifa (IL); Efraim Efi Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 14/225,960

(22) Filed: Mar. 26, 2014

(65) Prior Publication Data

US 2015/0277538 A1    Oct. 1, 2015

(51) Int. Cl.
 *G06F 1/32*    (2006.01)

(52) U.S. Cl.
 CPC ............ *G06F 1/3243* (2013.01); *G06F 1/324* (2013.01); *Y02B 60/1217* (2013.01); *Y02B 60/1239* (2013.01)

(58) Field of Classification Search
None
See application file for complete search history.

(56) References Cited

U.S. PATENT DOCUMENTS

| | | | | |
|---|---|---|---|---|
| 2006/0168571 A1* | 7/2006 | Ghiasi | ...................... | G06F 9/505 717/127 |
| 2008/0034236 A1* | 2/2008 | Takayama | ............. | G06F 1/3203 713/322 |
| 2012/0054519 A1* | 3/2012 | Branover | ............... | G06F 1/3203 713/322 |
| 2012/0180061 A1* | 7/2012 | Rao | ........................ | G06F 9/5088 718/104 |
| 2012/0260057 A1* | 10/2012 | Eyerman | ............... | G06F 1/3203 711/167 |
| 2012/0297232 A1* | 11/2012 | Bircher | .................... | G06F 1/324 713/500 |
| 2013/0346774 A1* | 12/2013 | Bhandaru | ............. | G06F 1/3234 713/320 |
| 2015/0095620 A1* | 4/2015 | Ananthakrishnan | | G06F 9/30083 712/220 |

* cited by examiner

*Primary Examiner* — Nitin Patel
*Assistant Examiner* — Joshua Neveln
(74) *Attorney, Agent, or Firm* — Lowenstein Sandler LLP

(57) ABSTRACT

A processing device implementing performance scalability prediction is disclosed. A processing device of the disclosure includes a first counter to increment with each cycle of the processing device in which threads of the processing device are active. The processing device further includes a second counter to increment with each cycle of the processing device in which execution units of the processing device are stalled for one of the threads, and an access request from the one of the threads to memory external to the processing device is pending.

18 Claims, 12 Drawing Sheets

PERFORMANCE SCALABILITY PREDICTION

TECHNICAL FIELD

The embodiments of the disclosure relate generally to processing devices and, more specifically, relate to performance scalability prediction for a processing device.

BACKGROUND

Processor power consumption has become a major issue in recent years. The current trend of processor design to multi-core architecture has eased the pressure on power consumption. However, power consumption still grows linearly with the number of cores being designed. Recent developments in technology have provided new opportunities to further optimize power consumption. For example, hardware optimization algorithms have been design to better align the utilization of hardware resources to current workload behavior in order to achieve better power performance.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
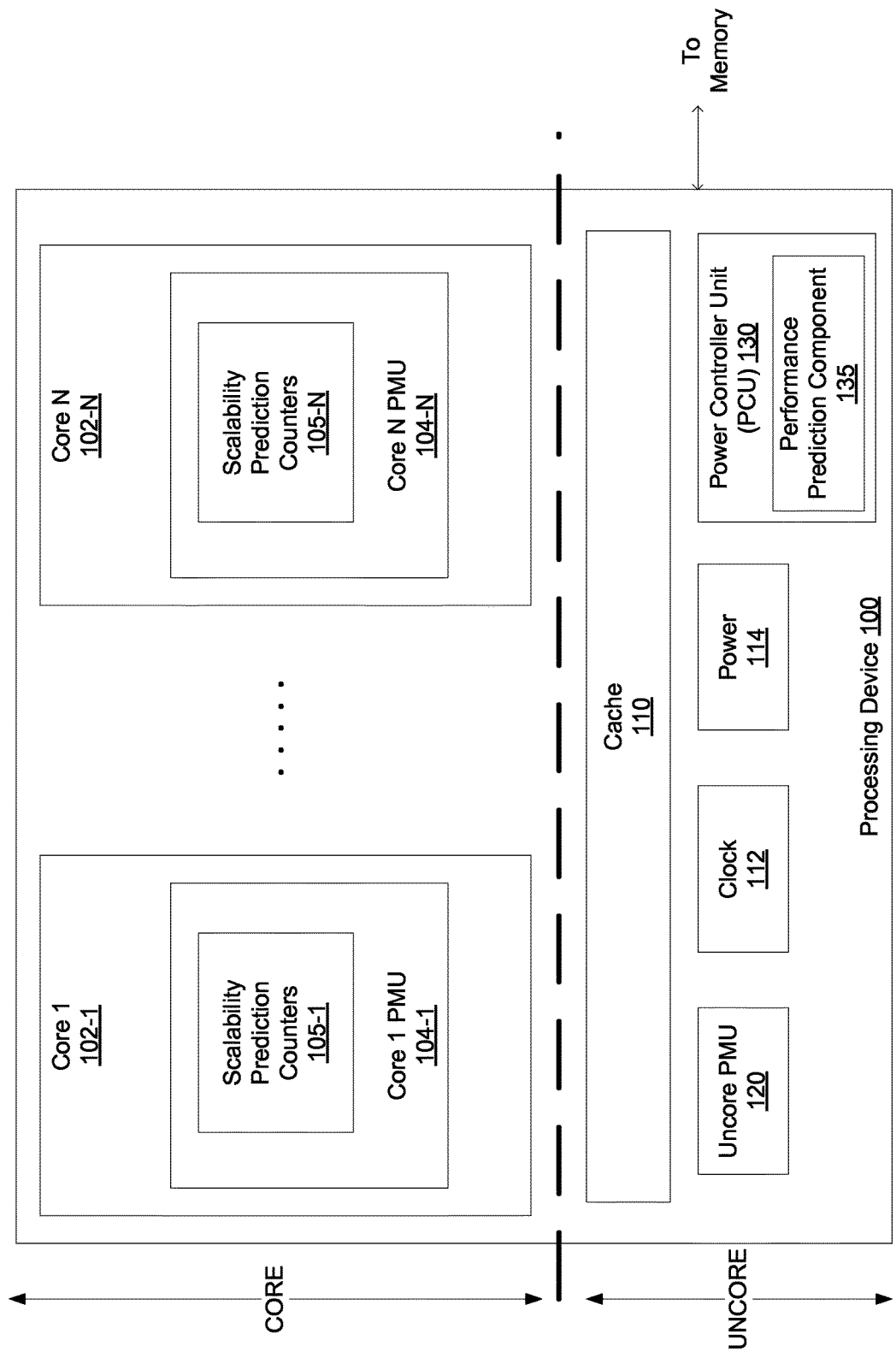
FIG. 1 illustrates a block diagram of a computing system, according to an embodiment of the disclosure.

Embodiments of the disclosure implement techniques for performance scalability prediction in a processing device. Power consumption by processors is an important issue in processor design. Recent developments in technology have provided new opportunities to further optimize power consumption. For example, hardware optimization algorithms have been designed to better align the utilization of hardware resources to current workload behavior in order to achieve better power performance. However, these hardware optimization do not reflect how effectively a workload is running in the processor and the associated power cost in the processor. Furthermore, these hardware optimization algorithms do not provide any information on the amount of performance that may be lost or gained due to frequency changes of the processor.

Embodiments of the disclosure overcome this problem by identifying a scalability of a workload running on a processor core to a change in frequency by the processor core. Workload may refer to a number of instructions being executed by the processor during a given period or at a particular instance of time. Scalability of the workload may refer to the change in the number of instructions executed due to the change in frequency. Utilizing this predicted scalability to frequency change, implementations can also predict the performance that would be reached by a processor core in view of different frequencies of the processor core. In some embodiments, performance may be measured as an inverse of execution time multiplied by a factor that changes according to a benchmark value.

As a result, the accurate estimation of scalability provided by implementations of the disclosure helps hardware optimization algorithms better align utilization of hardware resources to a current workload behavior in order to achieve better power performance. For example, having an accurate estimation of scalability helps the hardware optimization firmware to pick a best frequency for a processing device to operate. The frequency is estimated utilizing this ability to estimate a performance effect on the current behavior of the current execution hardware. For example, the workload execution behavior may be determined by an amount of cache stalls that occur during runtime. This behavior (e.g., cache stalls) may change due the current system status, which can be affected by other execution workloads and the system configurations (such as the cache size).

Previous solutions that offered scalability number calculated such scalability number using un-designated counters (typically a large number of performance counters were utilized). These scalability numbers did not apply to all workloads of the processor and often resulted in significant inaccuracies. Furthermore, the scalability numbers of prior solutions did not accurately reflect how much workload was sensitive to processor frequency, which resulted in incorrect quantification of scalable portions of the workload.

In one implementation, scalability for a processor core is predicted by utilizing a set of designated performance counters and heuristics to calculate a scalability factor based on the set of designated performance counters. The designated performance counters may include a core_stalls_L3_miss counter and a core_active counter. These designated performance counters may be part of a performance monitoring unit (PMU) of the processor core, or may be implemented as separate counters in the processor core. The core_stalls_L3_miss counter may count cycles where execution units are stalled and there is a pending external memory access for any of the threads of the processor core. The core_active counter may count each cycle that a thread is active (e.g., pending and utilizing the processor core). The scalability score is then determined by applying heuristics to the designated core counters, as described in more detail below.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations described below.

Although the following embodiments are described with reference to a processor, other embodiments are applicable to other types of integrated circuits and logic devices. Similar techniques and teachings of embodiments of the disclosure can be applied to other types of circuits or semiconductor devices that can benefit from higher pipeline throughput and improved performance. The teachings of embodiments of the disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

FIG. 1 illustrates a block diagram of a computing system 100, according to an embodiment of the disclosure. The system 100 may be a processing device (generally referred to as "processor 100" or processing device 100"). The processor 100 may communicate via an interconnection or bus. Processor 100 may include various components.

In one embodiment, processor 100 may include one or more processor cores 102-1 through 102-N (referred to herein as "cores 102", or more generally as "core 102"), a cache 110 (which may include one or more private or shared caches), a clock 112, a power component 114, an uncore performance management unit (PMU), and/or a power controller unit (PCU) 130.

The processing device 100 may also include a communication component (such as a router, a bus, an interconnection, a controller, etc.) that may be used to communicate between various components of the processor cores 102 and/or other system components outside of the processing device 100. Moreover, the communication component may be in communication to enable data routing between various components inside or outside of the processor 100. The processor cores 102 may be implemented on a single integrated circuit (IC) chip. Moreover, the IC may include one or more shared and/or private caches (such as cache 110), buses or interconnections, memory controllers, or other components.

The cache 110 may store data (e.g., including instructions) that are utilized by one or more components of the processor 100, such as the cores 102. For example, the cache 110 may locally cache data stored in a memory for faster access by the components of the processor 100. The memory may be in communication with the processor 100 via an interconnection. In one embodiment, the cache 110 may be a last level cache (LLC), such as an L3 cache. Also, each of the cores 102 may include a level 1 (L1) cache (not shown). Furthermore, the processor 100 may also include a mid-level cache that is shared by several cores 102. Various components of the processor 100 may communicate with the cache 110 directly, through a bus and/or a memory controller or hub.

In one embodiment, each core 102 includes a PMU 104-1 through 104-N (referred to herein as "PMU 104"). PMU 104 may be hardware of the core 102 that monitors discrete events during code execution by the core 102. The PMU 104 may implement counters and logic to monitor micro-architectural events of the core 102 including, but not limited to, elapsed cycles, instructions, cache hits, cache misses, and so on. The PMU 104 is a subsystem that aids in analysis of how an application or operating system (OS) are performing on the processor core.

In one implementation, the processing device 100 implements performance scalability prediction by incorporating scalability prediction counters 105-1 through 105-N (referred to herein as "scalability prediction counters 105") in the PMU 104. In some implementations, the scalability prediction counters 105 may be implemented as separate counters from the functionality of PMU 105 in the processor core 102. Information collected by the scalability prediction counters 105 may be transferred to a global controller, such as PCU 130. PCU 130 may be a micro-controller responsible for power and thermal management of the processor 100. The PCU may receive metrics from the core PMU 104, as well as from uncore PMU 120, and apply these metrics in the performance management component 135. Uncore PMU 120 may refer to hardware components that monitor micro-architectural events of the "uncore". The "uncore" may refer to the part of the processor 100 outside of the cores 102 and that contains the integrated memory controller, the interconnect to the other processors, and the I/O hub, for example. The uncore components may include the cache 110, the clock 112, the power component 114, and various other components.

Performance management component 135 may include, but is not limited to, logic to implement hardware optimization algorithms to align utilization of hardware resources of the processor 100 to current workload behavior in order to achieve better power performance for the processor 100. In one embodiment, "performance" is measured as an inverse of execution time multiplied by a factor that changes according to a benchmark value. For example, performance management component 135 may determine one or more frequencies to apply to processor cores 102 to optimize power efficiency of the processor 100. Example hardware optimization algorithms may include, but are not limited to, a Race to Halt algorithm, Energy Efficient Turbo algorithm, Core Duty Cycle algorithm, uncore frequency selection algorithm, and graphics to IA current and power balancer algorithm. Further details regarding the scalability prediction counters 105 are described below with respect to FIG. 2.

Figure 2:
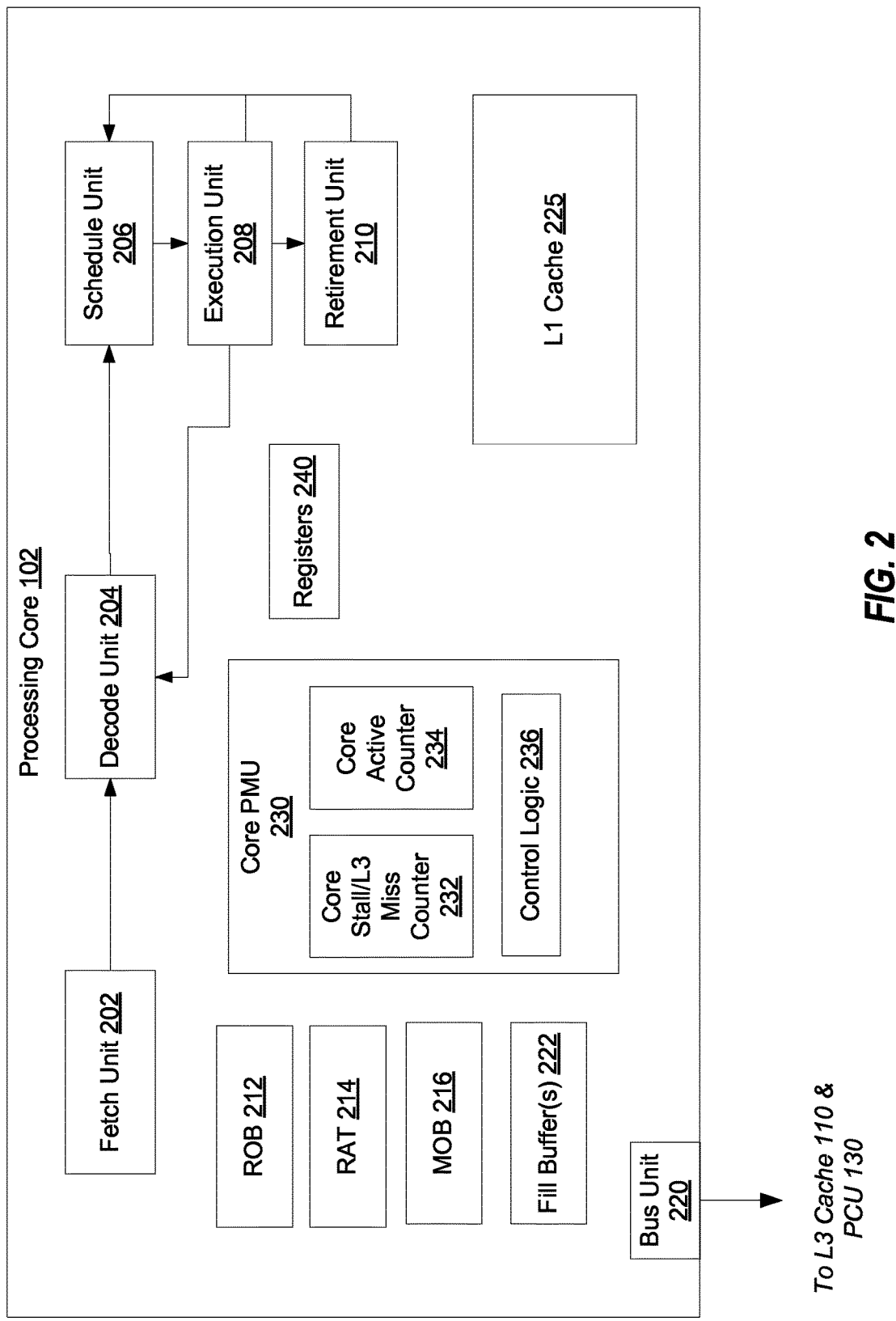
FIG. 2 is a flow diagram illustrates a block diagram of a processor core, according to an embodiment of the disclosure.

FIG. 2 illustrates a block diagram of a processor core 102, according to an embodiment of the disclosure. In one embodiment, processor core 102 is the same as processor core 102 described with respect to FIG. 1. The arrows shown in FIG. 2 may illustrate the flow of instructions through the core 102. One or more processor cores (such as the processor core 102) may be implemented on a single IC chip (or die) s discussed with reference to FIG. 1. Moreover, the chip may include one or more shared and/or private caches (e.g., cache 110 of FIG. 1), interconnections, memory controllers, or other components. In one embodiment, processor core 102 shown in FIG. 2 may be utilized to provide performance scalability prediction.

As illustrated in FIG. 2, the processor core 102 may include a fetch unit 202 to fetch instructions for execution by the core 102. The instructions may be fetched from any storage device and/or other memory devices. The core may also include a decode unit 204 to decode the fetched instruction. For instance, the decode unit 204 may decode the fetched instruction into a plurality of micro-operations (uops).

Additionally, the core 102 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as a memory execution unit, an integer execution unit, a floating-point execution unit, or other execution units. Further, the execution unit 208 may execute instructions out-of-order. Hence, the processor core 102 may be an out-of-order processor core in one embodiment.

The core 102 may also include a retirement unit 210. The retirement unit 210 may retire executed instructions after they are committed. In an embodiment, retirement of the executed instructions may result in processor state being committed from the execution of the instructions, physical registers used by the instructions being deallocated, etc.

As shown in FIG. 2, the core 102 may include a reorder buffer (ROB) 212 to store information about in-flight instructions (or uops) for access by various components of the core 102. The core 102 may further include a register alias table (RAT) 214 to maintain a mapping of logical (or architectural) registers (such as those identified by operands of software instructions) to corresponding physical registers. In one embodiment, each entry in the RAT 214 may include a ROB identifier assigned to each physical register. Additionally, a memory order buffer (MOB), which may include a load buffer or a store buffer, may store pending memory operations that have not loaded or written back to memory (e.g., a memory that is external to the core 102, such as cache 110).

Furthermore, the core 102 may include a bus unit 220 to allow communication between components of the core 102 and other components (such as the components discussed with respect to FIG. 1) via one or more buses (e.g., buses 104 and/or 112). For example, the core 102 may communicate with the cache 110 and/or the PCU 130 described with respect to FIG. 1. The core 102 may also include an L1 cache 225 to local store data for faster access by core 102.

In some embodiments, the core 102 includes a core PMU 230 that implements performance scalability prediction. In one implementation, the core PMU 230 is the same as PMU 104 described with respect to FIG. 1. Scalability for the processor core 102 may be predicted by utilizing a set of designated performance counters in the core PMU 230. The designated performance counters may include a core_stalls_L3_miss counter 232 and a core_active counter 234. These designated performance counters may be part of the core PMU 230, as shown, or may be implemented as separate counters in the processor core 102. Other implementations may refer to the designated performance counters 232, 234 by different nomenclature.

The core_stalls_L3_miss counter 232 may count cycles where execution units are stalled and there is a pending external memory access for any of the threads of the processor core. The core_active counter 234 may count cycles that one of the hardware threads in a processor core is active. Scalability of the processor core 102 to a frequency change is based on the connection between stalled execution of the processor core 102 while there is a pending memory access to the lower level cache (LLC). As such, a scalability score for the processor core 102 may be determined by applying heuristics to the designated core counters 232, 234.

In one implementation, the PCU 130 may receive data from the core_stalls_L3_miss counter 232 and the core_active counter 234, and apply heuristics to this data to calculate a scalability factor for the processor core 102, as follows:

$$\text{Scalability\_Factor}=1-(\text{core\_stalls\_}L3\_\text{miss/core\_active})$$

The scalability factor describes the portion of the running workload that is scalable to frequency change. In some implementations, the scalability factor may be smoothed. This is in contrast to a classic definition of scalability defined as the relative amount of performance change due to frequency change.

Using the scalability factor above, it may possible to divide any processor core workload execution into two major portions: (1) a portion which gains from increase in frequency; and (2) a fixed portion which does not gain from an increase in frequency (typically bound on memory).

In addition, using the scalability factor above, performance of the processor core at different frequencies may also be predicted, as follows:
T—Total time of workload.
p—Scalable part, measured by the formula.
Ta—Active part, gains from frequency. Ta=T*p.
Tp—Passive part, doesn't gain from frequency. Tp=T*(1−p)
Freq1—Frequency at current measurement point.
Performance_Score1—The performance score at measurement point.
f—Frequency we want to predict the performance for $$T\_\text{predicted }(f)=Ta*(\text{Freq1}/f)+Tp.$$

Assumed here is that the Performance Score is a function of time mean score−Constant divided by execution time, so that it may possible to calculate the Performance Scores by the formula, as they are the inverse of execution time:

$$\text{Performance\_Score\_predicted}(f)=\text{Performance\_Score1}/(p*(\text{Freq1}/f)+(1-P))$$

Using the scalability factor, the PCU 130 can select a frequency utilizing the obtained knowledge of the expected change in performance. Namely, if the scalability factor is high, increasing the frequency may result in a large performance increase. Conversely, if the scalability factor is low, increasing the frequency is unlikely to gain significant performance.

Figure 3:
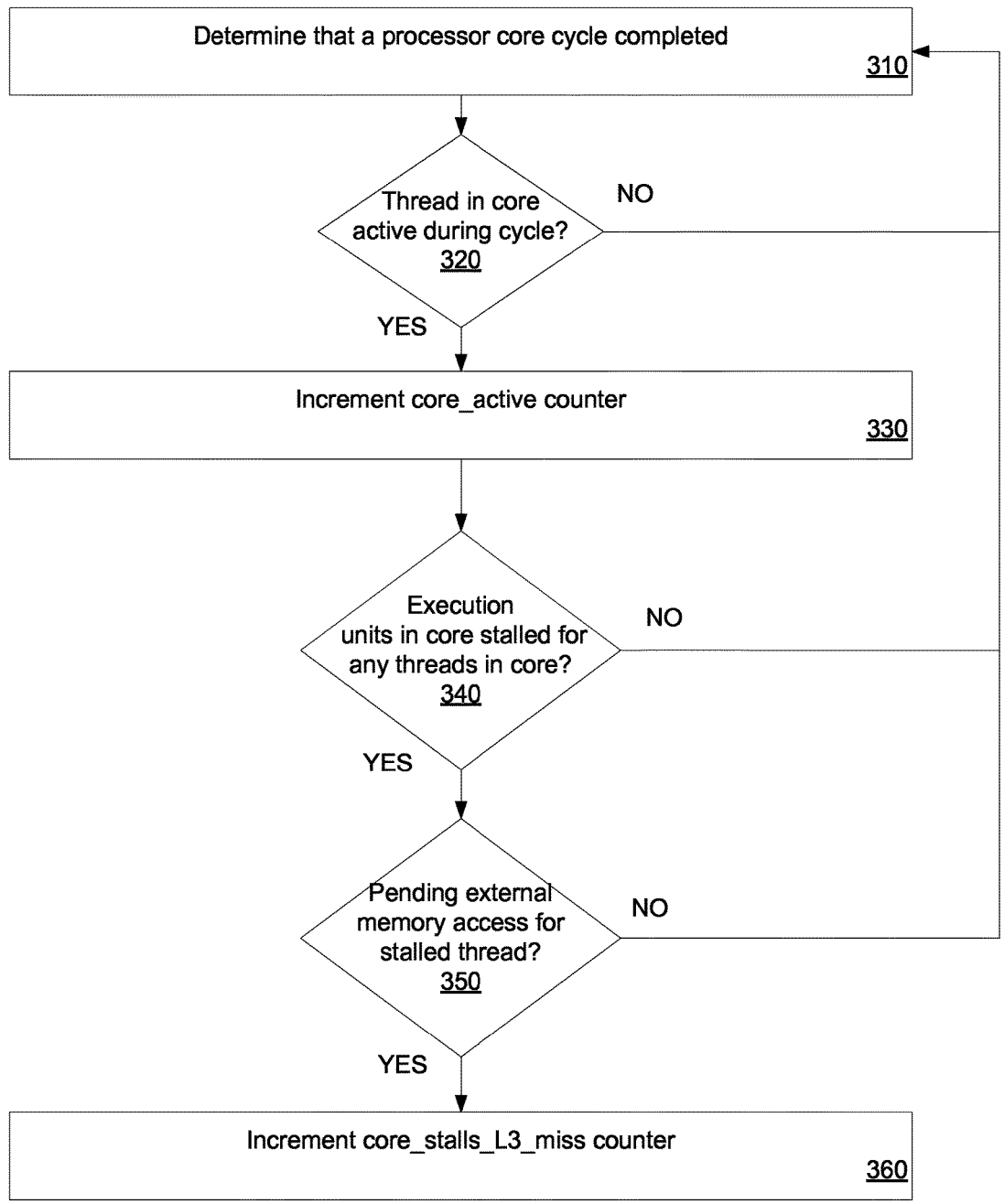
FIG. 3 is a flow diagram illustrating a method for implementing performance scalability prediction according to an implementation of the disclosure.

FIG. 3 is a flow diagram illustrating a method 300 for implementing performance scalability prediction according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by core 102 of FIGS. 1 and 2.

Method 300 begins at block 310 where it is determined that a processor core cycle has completed. Then, at decision block 320, the core determines whether any threads in the core were active during the core cycle. If not, then method 300 returns to block 310. If so, then method 300 continues to block 330 where a core_active counter is incremented. In one implementation, the core_active counter is a hardware counter maintained in the processor core to count all cycle that occur while one of the hardware threads in the processor core is active. The core_active counter may be part of a PMU of the core.

Then, at decision block 340, it is determined whether any execution units in the core were stalled for any of the threads during the cycle. If not, then method 300 returns to block 310. On the other hand, if execution units for any of the core's thread were stalled during the cycle, then method 300 continues to decision block 350.

At decision block 350, it is determined whether there were any pending external (i.e., to the processor housing the core) memory accesses for the stalled thread during the cycle. If not, then method 300 returns to block 310. On the other hand, if there were pending external memory accesses pending for the stalled thread, then method 300 continues to block 360. At block 360, a core_stalls_L3_miss counter is incremented for the core. In one implementation, the core_stalls_L3_miss counter is a hardware counter maintained in the core to count all cycles where execution units are stalled and there is a pending external memory access for any of the core's threads. The core_stalls_L3_miss counter may be part of a PMU of the core. Method 300 may then end or may return to block 310 to continue incrementing the counters during each core cycle.

Figure 4:
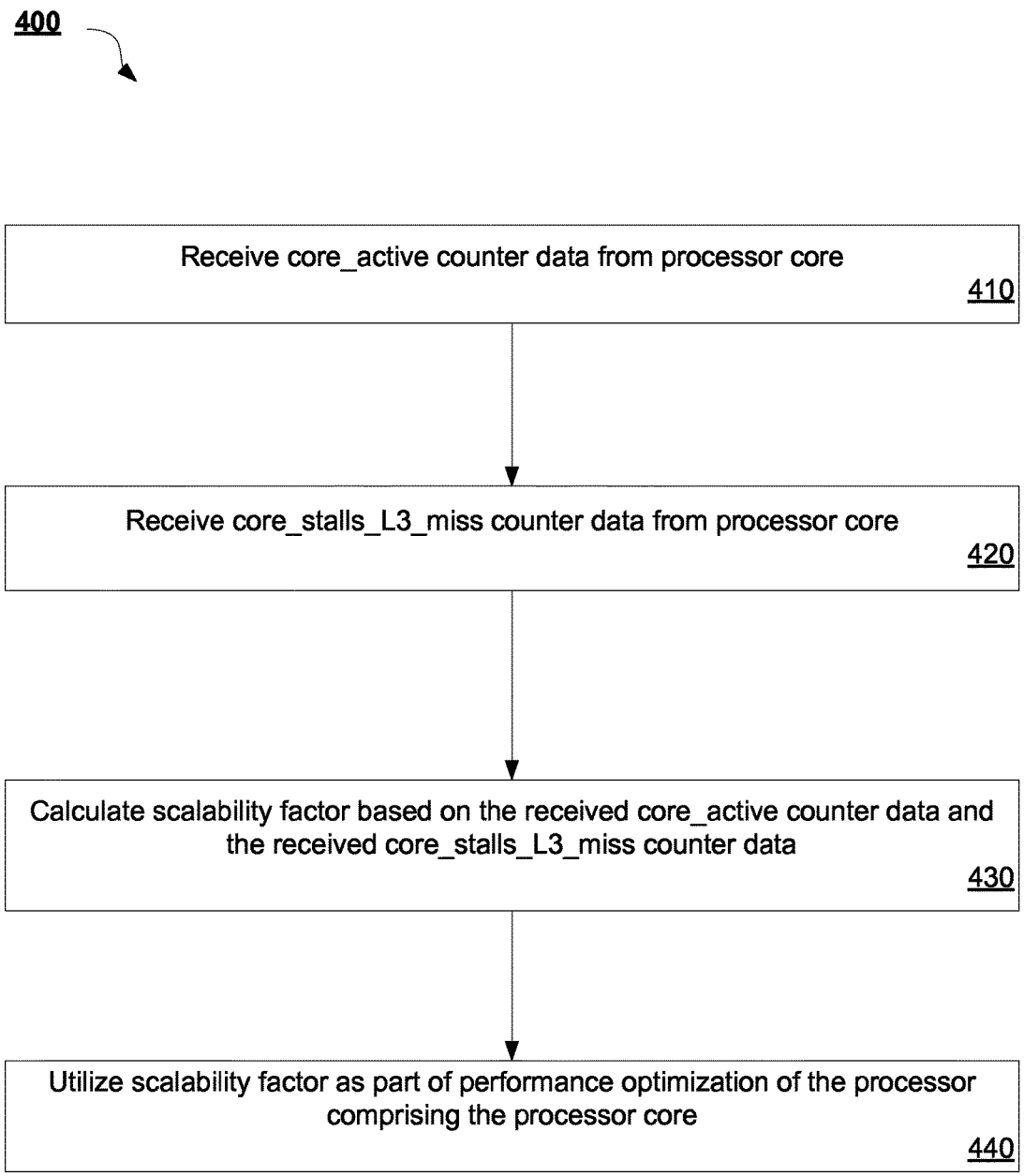
FIG. 4 is a flow diagram illustrating a method for predicting a scalability factor for performance optimization according to an implementation of the disclosure.

FIG. 4 is a flow diagram illustrating a method 400 for predicting a scalability factor for performance optimization according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by processor 100 of FIG. 1.

Method 400 begins at block 410 where core_active counter data is received from a processor core. In some implementations, core_active counter data may be received from multiple cores of a processing device. As previously discussed, the core_active counter may be a hardware counter maintained in the processor core to count all cycle that occur while one of the hardware threads in the processor core is active. The core_active counter may be part of a PMU of the core.

At block 420, core_stalls_L3_miss counter data is received from a processor core. In some implementations, core_stalls_L3_miss counter data may be received from multiple cores of a processing device. As previously discussed, the core_stalls_L3_miss counter may be a hardware counter maintained in the core to count all cycles where execution units are stalled and there is a pending external memory access for any of the core's threads. The core_stalls_L3_miss counter may be part of a PMU of the core.

Subsequently, at block 430, a scalability factor is calculated for the core based on the received core_active counter data and the received core_stalls_L3_miss counter data. In one implementation, the scalability factor for the core 102 may be calculated as follows: Scalability_ Factor=1−(core_stalls_L3_miss/core_active). The scalability factor describes the portion of the running workload that is scalable to frequency change. In some implementations, the scalability factor may be smoothed. In one implementation, a PCU of the processor may perform the scalability factor calculation for each core of the processing device.

Lastly, at block 440, the scalability factor is utilized as part of performance optimizations applied to the processing device that includes the processor core. The performance optimizations may utilize the scalability factor of each core of the processing device as one of multiple factors in algorithms that align utilization of hardware resources of the processor to current workload behavior in order to achieve better power performance for the processing device. In one implementation, the PCU of the processing device may perform the performance optimizations. Example hardware optimization algorithms may include, but are not limited to, a Race to Halt algorithm, Energy Efficient Turbo algorithm, Core Duty Cycle algorithm, uncore frequency selection algorithm, and graphics to IA current and power balancer algorithm.

Figure 5A:
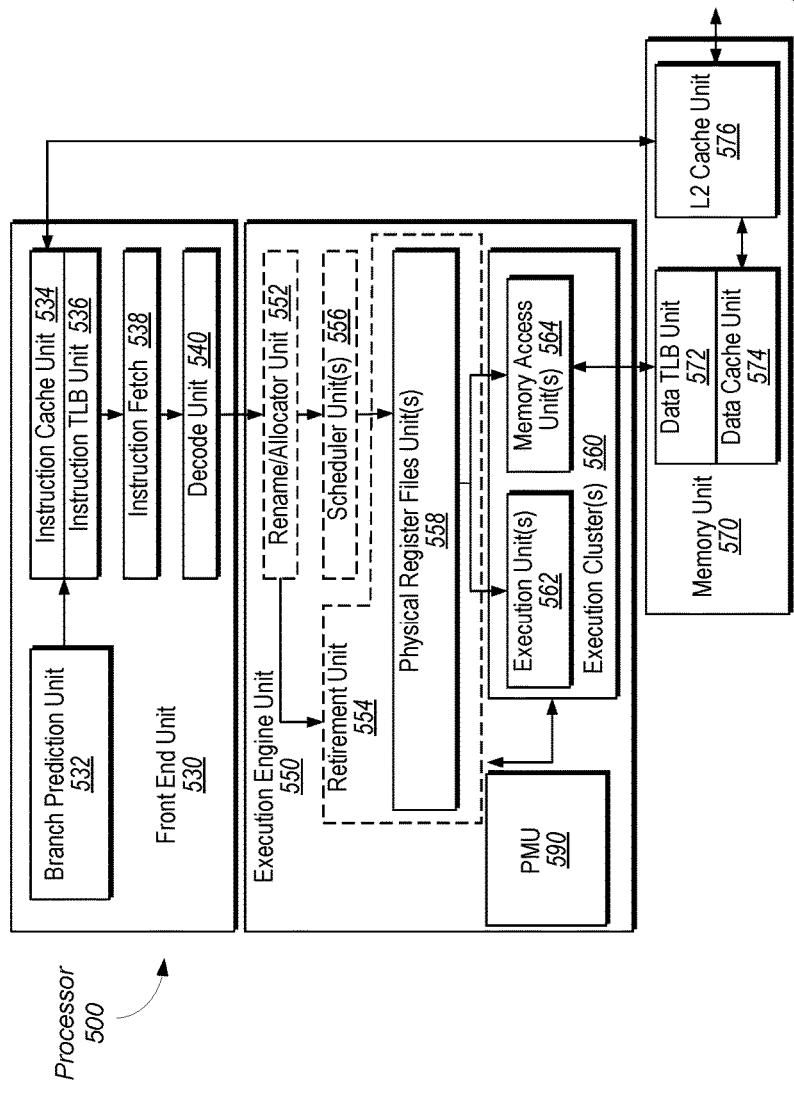
FIG. 5A is a block diagram illustrating a micro-architecture for a processor that implements performance scalability prediction in which one embodiment of the disclosure may be used.

FIG. 5A is a block diagram illustrating a micro-architecture for a processor 500 that implements performance scalability prediction in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 100 may be the same as processor 100 described with respect to FIG. 1. In particular, the execution engine unit 550 may include a PMU 590 that is the same as PMU 104, 230 described with respect to FIGS. 1 and 2, to implement performance scalability prediction described with respect to implementations of the disclosure.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
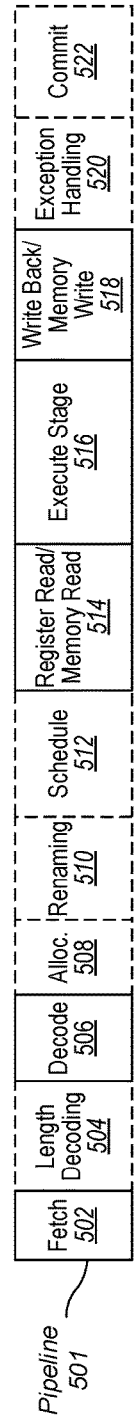
FIG. 5B is a block diagram illustrating an in-order pipeline and a register renaming stage, out-of-order issue/execution pipeline implemented according to at least one embodiment of the disclosure.

FIG. 5B is a block diagram illustrating a processor pipeline 501 including an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 501 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
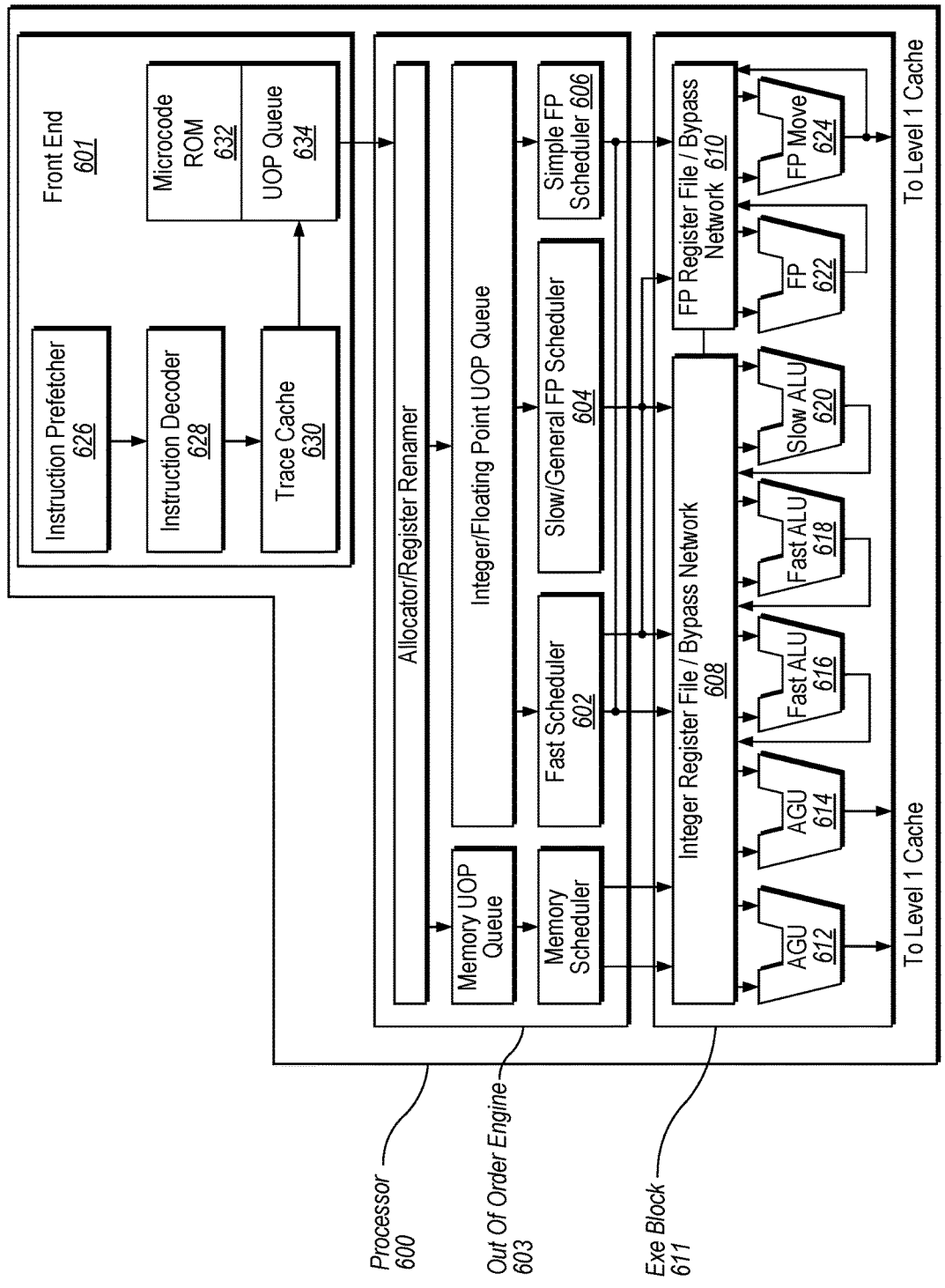
FIG. 6 illustrates a block diagram of the micro-architecture for a processor that includes logic circuits to implement performance scalability prediction in accordance with one embodiment of the disclosure.

FIG. 6 illustrates a block diagram of the micro-architecture for a processor 600 that includes logic circuits to implement performance scalability prediction in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
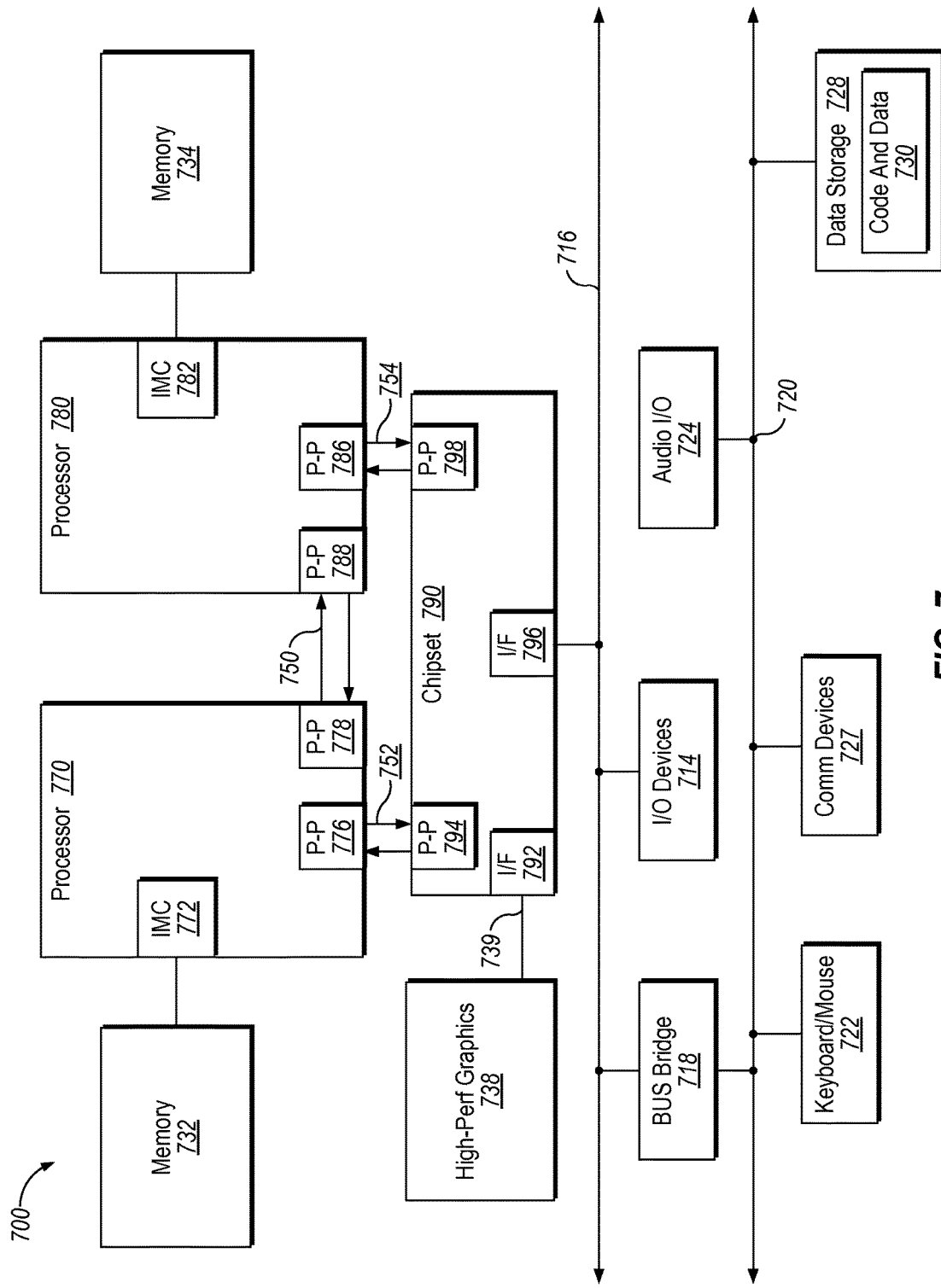
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement performance scalability prediction as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
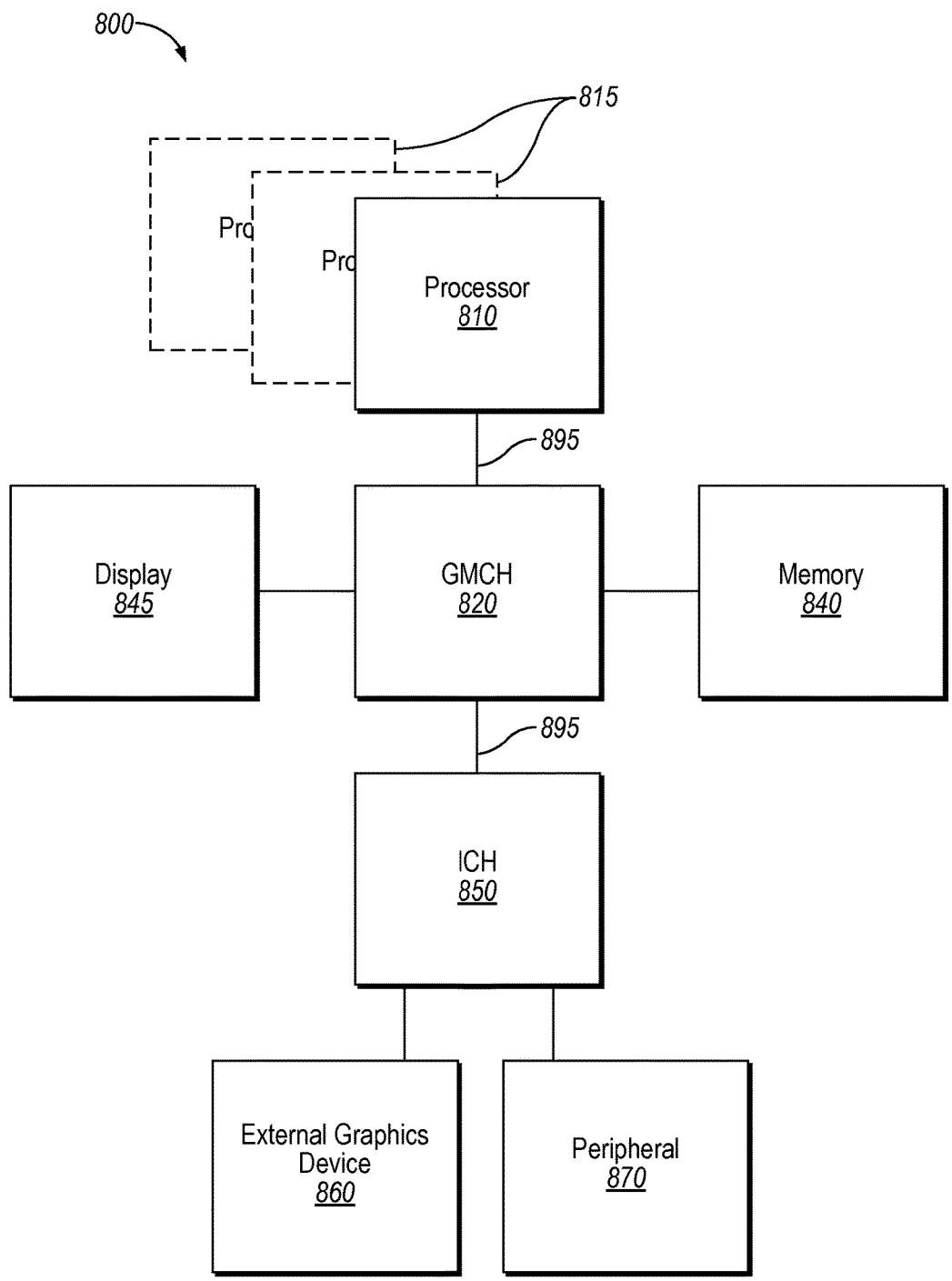
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement performance scalability prediction according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
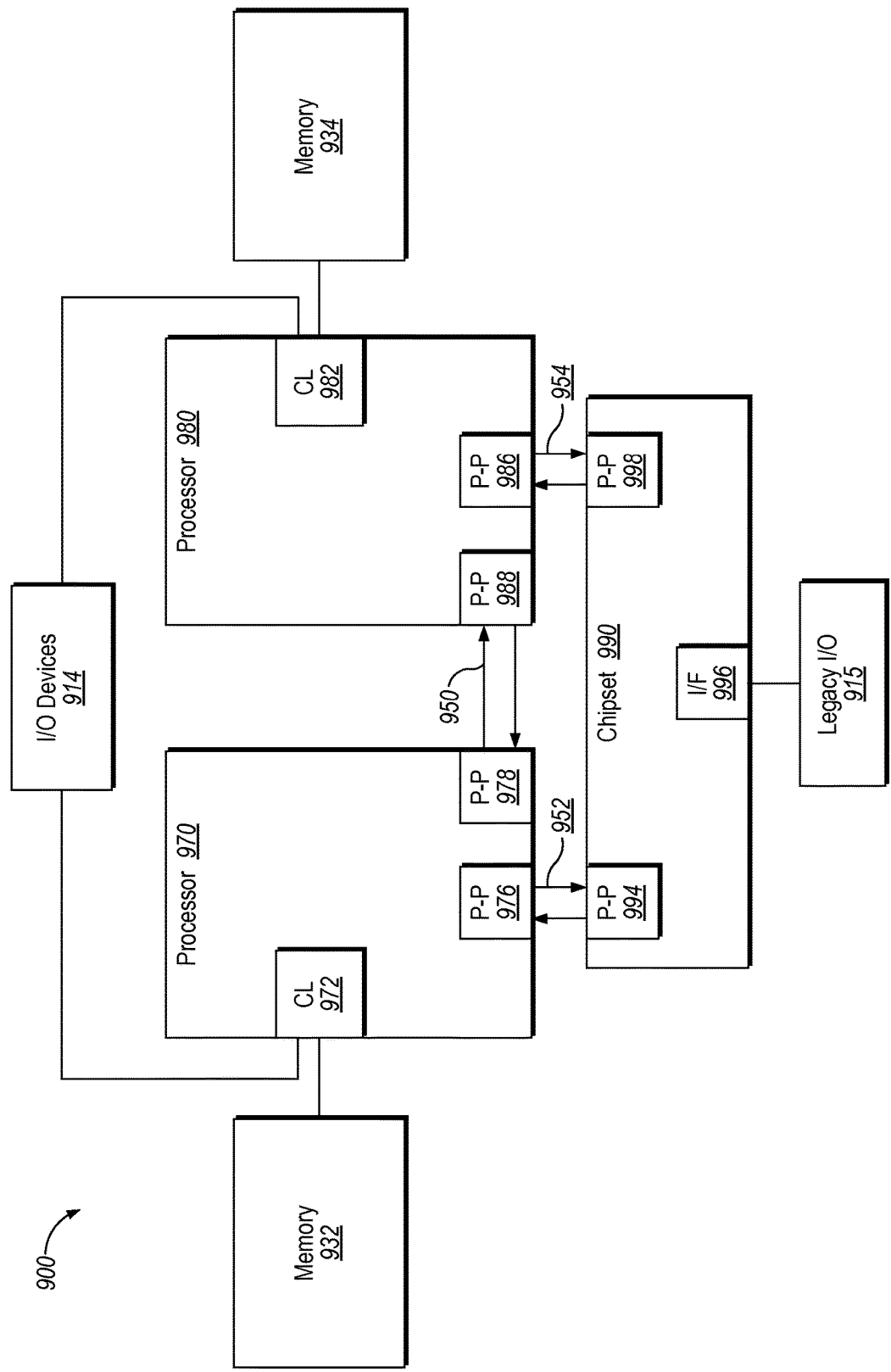
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement performance scalability prediction as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
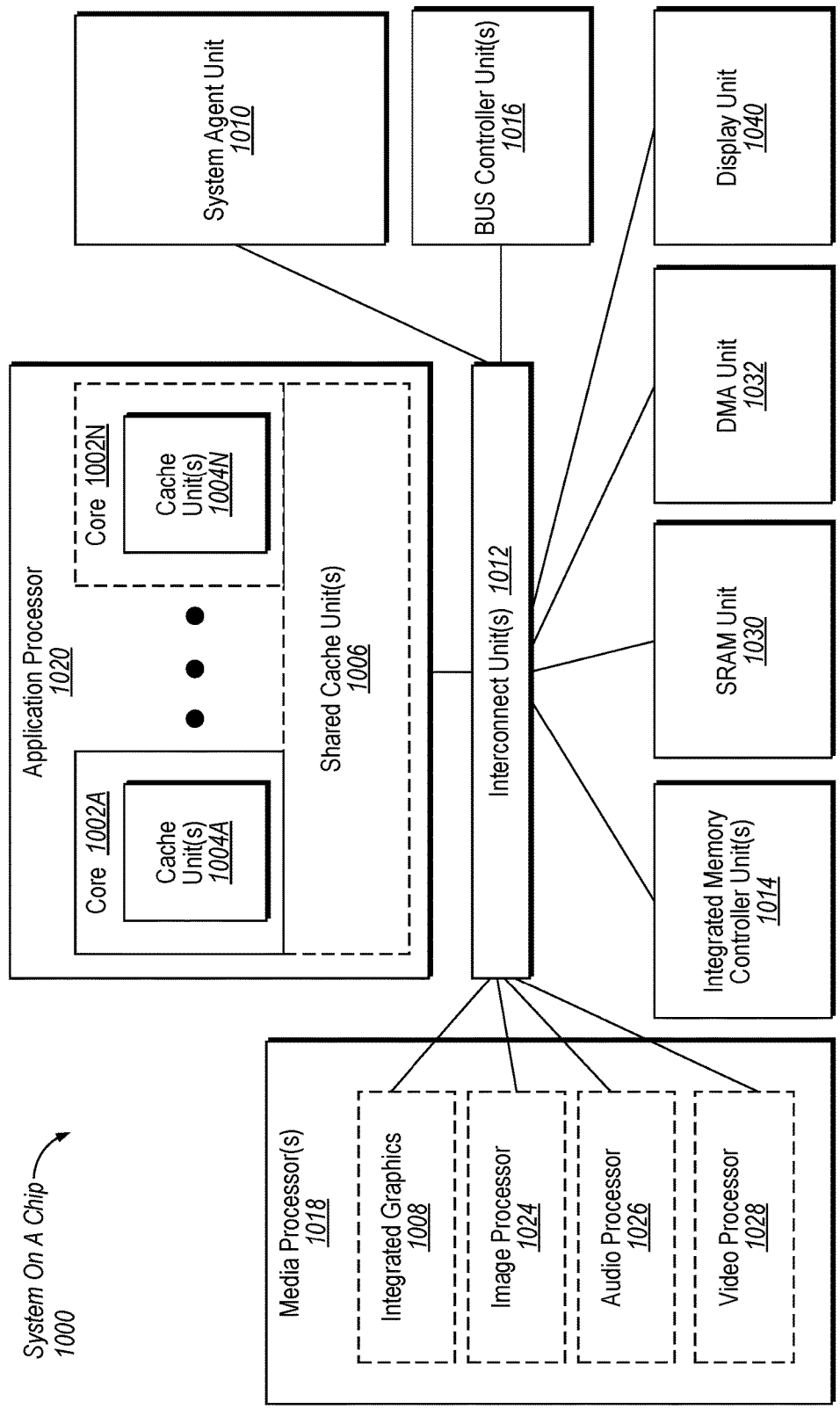
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a PMU for implementing performance scalability prediction as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
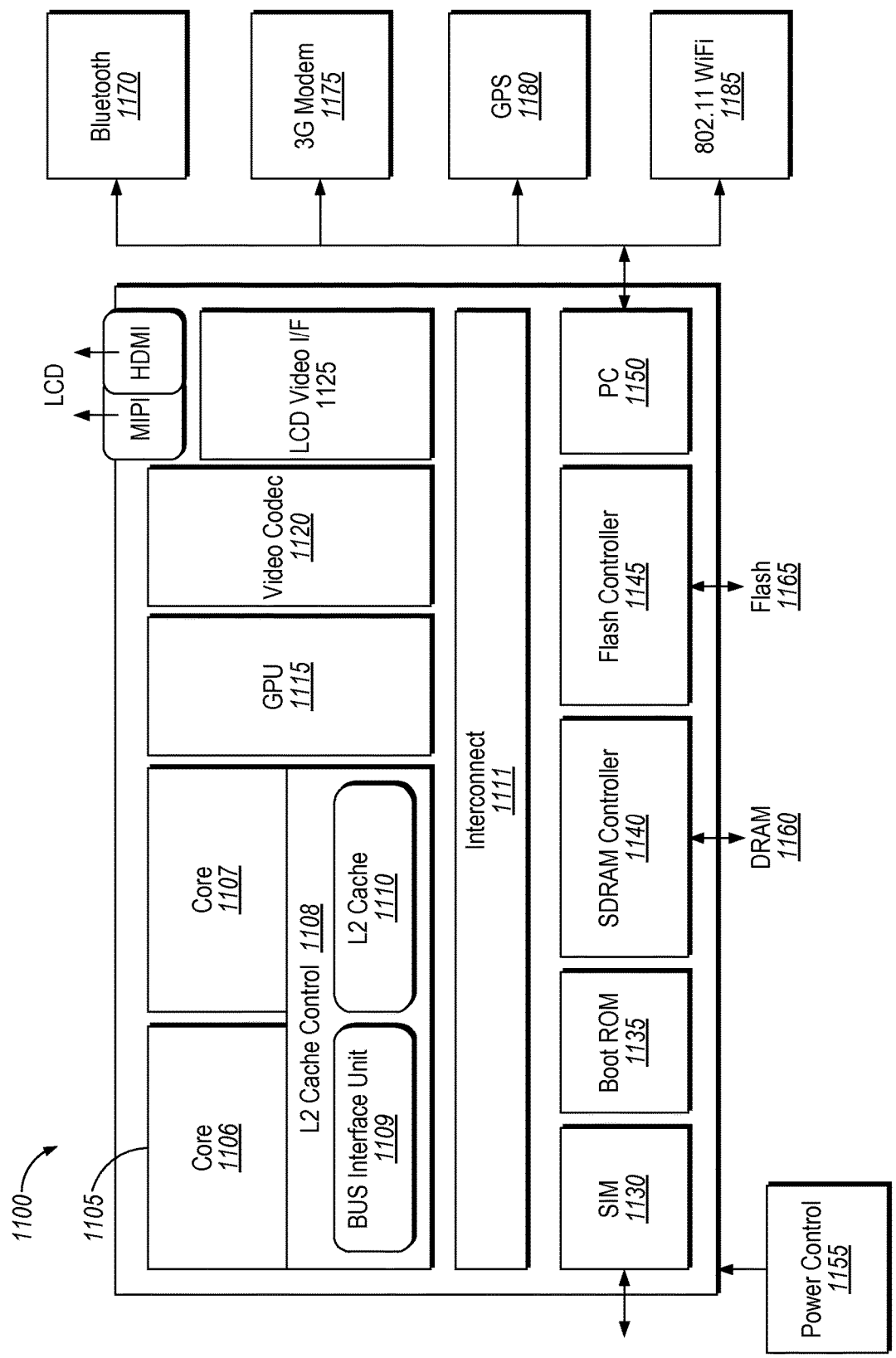
FIG. 11 is a block diagram of an embodiment of a SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement performance scalability prediction as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
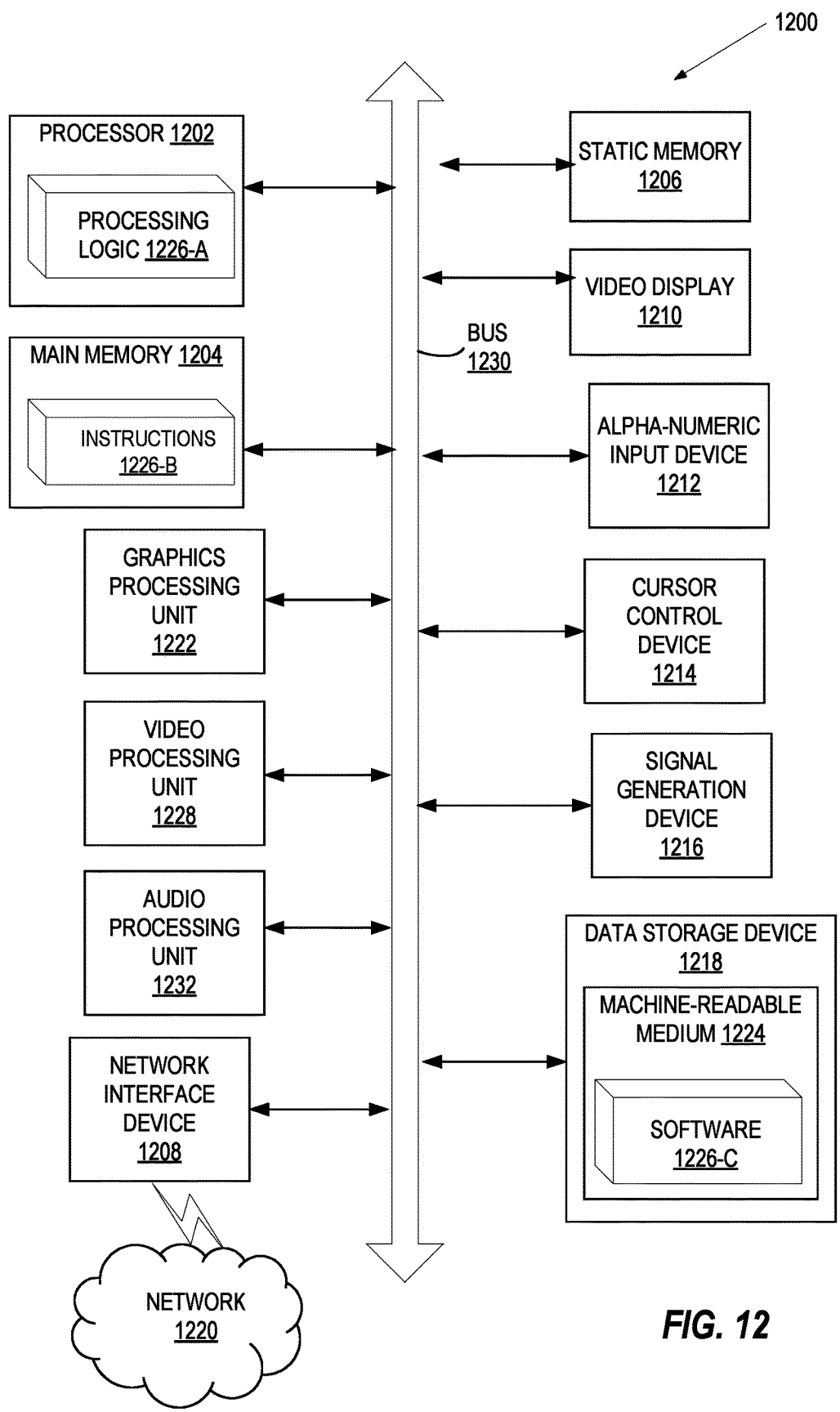
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226-A for performing the operations and steps discussed herein. In one embodiment, processing device 1202 is the same as processor architecture 100 described with respect to FIG. 1 that implements performance scalability prediction as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226-C implementing any one or more of the methodologies of functions described herein, such as implementing store address prediction for memory disambiguation as described above. The software 1226-C may also reside, completely or at least partially, within the main memory 1204 as instructions 1226-B and/or within the processing device 1202 as processing logic 1226-A during execution thereof by the computer system 1200; the main memory 1204 and the processing device 1202 also constituting machine-accessible storage media.

The machine-readable storage medium 1224 may also be used to store software 1226-C embodied as instructions implementing performance scalability prediction such as described with respect to processing device 100 in FIG. 1, and/or a software library containing methods that call the above applications. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing device for implementing performance scalability prediction. Further to Example 1, the processing device includes a first counter to increment with each cycle of the processing device in which threads of the processing device are active. The processing device further includes a second counter to increment with each cycle of the processing device in which execution units of the processing device are stalled for one of the threads and an access request from the one of the threads to memory external to the processing device is pending.

In Example 2, the subject matter of Example 1 can optionally include wherein a scalability factor is calculated from values of the first counter and the second counter, the scalability factor comprising a portion of a current workload of the processing device that is scalable to a frequency change at the processing device. In Example 3, the subject matter of any one of Examples 1-2 can optionally include wherein the scalability factor is calculated by subtracting the quotient of the value of the first counter and the value of the second counter from one. In Example 4, the subject matter of any one of Examples 1-3 can optionally include wherein the current workload comprises instructions being executed by the processing device.

In Example 5, the subject matter of any one of Examples 1-4 can optionally include wherein the scalability factor is calculated by a power controller unit (PCU) of the processing device. In Example 6, the subject matter of any one of Examples 1-5 can optionally include wherein the scalability factor is used to predict a performance change due to the frequency change at the processing device. In Example 7, the subject matter of any one of Examples 1-6 can optionally include wherein the first counter and the second counter are part of a performance monitoring unit (PMU) of the processing device.

In Example 8, the subject matter of any one of Examples 1-7 can optionally include wherein the PCU utilizes the scalability factor as one of multiple inputs to performance optimizations performed by the PCU to adjust a frequency of the processing device. In Example 9, the subject matter of any one of Examples 1-8 can optionally include wherein the processing device comprises multiple cores, each core comprising the first counter and the second counter. All optional features of the apparatus described above may also be implemented with respect to the method or process described herein.

Example 10 is a method for performance scalability prediction comprising incrementing, by a processing device, a first counter with each cycle of the processing device in which threads of the processing device are active. The method further comprises incrementing, by the processing device, a second counter with each cycle of the processing device in which execution units of the processing device are stalled for one of the threads, and an access request from the one of the threads to memory external to the processing device is pending.

In Example 11, the subject matter of Example 10 can optionally include further comprising calculating a scalability factor from values of the first counter and the second counter, the scalability factor comprising a portion of a current workload of the processing device that is scalable to a frequency change at the processing device. In Example 12, the subject matter of any one of Examples 10-11 can optionally include wherein the scalability factor is calculated by subtracting the quotient of the value of the first counter and the value of the second counter from one.

In Example 13, the subject matter of any one of Examples 10-12 can optionally include wherein the current workload comprises instructions being executed by the processing device. In Example 14, the subject matter of any one of Examples 10-13 can optionally include wherein the scalability factor is calculated by a power controller unit (PCU) of the processing device.

In Example 15, the subject matter of any one of Examples 10-14 can optionally include wherein the scalability factor is used to predict a performance change due to the frequency change at the processing device. In Example 16, the subject matter of any one of Examples 10-15 can optionally include wherein the first counter and the second counter are part of a performance monitoring unit (PMU) of the processing device. In Example 17, the subject matter of any one of Examples 10-16 can optionally include wherein the PCU utilizes the scalability factor as one of multiple inputs to performance optimizations performed by the PCU to adjust a frequency of the processing device.

In Example 18, the subject matter of any one of Examples 10-17 can optionally include wherein the processing device comprises multiple cores, each core comprising the first counter and the second counter.

Example 19 is a system for implementing performance scalability prediction. In Example 19, the system includes a memory and a processing device communicably coupled to the memory, the processing device comprising a plurality of cores. Further to Example 19, each of the plurality of cores comprise a first counter to increment with each cycle of the processing device in which threads of the processing device are active, and a second counter to increment with each cycle of the processing device in which execution units of the processing device are stalled for one of the threads, and an access request from the one of the threads to memory external to the processing device is pending.

In Example 20, the subject matter of Example 19 can optionally include wherein a scalability factor is calculated from values of the first counter and the second counter, the scalability factor comprising a portion of a current workload of the processing device that is scalable to a frequency change at the processing device. In Example 21, the subject matter of any one of Examples 19-20 can optionally include wherein the scalability factor is calculated by subtracting the quotient of the value of the first counter and the value of the second counter from one.

In Example 22, the subject matter of any one of Examples 19-21 can optionally include wherein the current workload comprises instructions being executed by the processing device. In Example 23, the subject matter of any one of Examples 19-22 can optionally include wherein the scalability factor is calculated by a power controller unit (PCU) of the processing device. In Example 24, the subject matter of any one of Examples 19-23 can optionally include wherein the scalability factor is used to predict a performance change due to the frequency change at the processing device.

In Example 25, the subject matter of any one of Examples 19-24 can optionally include wherein the first counter and the second counter are part of a performance monitoring unit (PMU) of the processing device. In Example 26, the subject matter of any one of Examples 19-25 can optionally include wherein the PCU utilizes the scalability factor as one of multiple inputs to performance optimizations performed by the PCU to adjust a frequency of the processing device. All optional features of the system described above may also be implemented with respect to the method or process described herein.

Example 27 is a non-transitory computer-readable medium for implementing performance scalability prediction. In Example 27, the non-transitory machine-readable medium includes data that, when accessed by a processing device, cause the processing device to perform operations comprising incrementing, by the processing device, a first counter with each cycle of the processing device in which threads of the processing device are active. Further to Example 27, the the operations further include incrementing, by the processing device, a second counter with each cycle of the processing device in which execution units of the processing device are stalled for one of the threads, and an access request from the one of the threads to memory external to the processing device is pending.

In Example 28, the subject matter of Example 27 can optionally include further comprising calculating a scalability factor from values of the first counter and the second counter, the scalability factor comprising a portion of a current workload of the processing device that is scalable to a frequency change at the processing device. In Example 29, the subject matter of Examples 27-28 can optionally include wherein the scalability factor is calculated by subtracting the quotient of the value of the first counter and the value of the second counter from one. In Example 30, the subject matter of Examples 27-29 can optionally include wherein the current workload comprises instructions being executed by the processing device. In Example 31, the subject matter of Examples 27-20 can optionally include wherein the scalability factor is calculated by a power controller unit (PCU) of the processing device.

In Example 32, the subject matter of Examples 27-31 can optionally include wherein the scalability factor is used to predict a performance change due to the frequency change at the processing device. In Example 33, the subject matter of Examples 27-32 can optionally include wherein the first counter and the second counter are part of a performance monitoring unit (PMU) of the processing device. In Example 34, the subject matter of Examples 30-33 can optionally include wherein the PCU utilizes the scalability factor as one of multiple inputs to performance optimizations performed by the PCU to adjust a frequency of the processing device. In Example 35, the subject matter of Examples 30-34 can optionally include wherein the processing device comprises multiple cores, each core comprising the first counter and the second counter.

Example 36 is an apparatus for implementing performance scalability prediction comprising means for incrementing, by the processing device, a first counter with each cycle of the processing device in which threads of the processing device are active, and means for incrementing, by the processing device, a second counter with each cycle of the processing device in which execution units of the processing device are stalled for one of the threads; and an access request from the one of the threads to memory external to the processing device is pending. In Example 37, the subject matter of Example 36 can optionally include the apparatus further configured to perform the method of any one of the Examples 11 to 18.

Example 38 is at least one machine readable medium comprising a plurality of instructions that in response to being executed on a computing device, cause the computing device to carry out a method according to any one of Examples 10-18. Example 39 is an apparatus for performance scalability prediction, configured to perform the method of any one of Examples 10 to 18. Example 40 is an apparatus for implementing performance scalability prediction comprising means for performing the method of any one of claims 10 to 18. Specifics in the Examples may be used anywhere in one or more embodiments.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device, comprising:
   a first counter to increment with each cycle of the processing device in which at least one thread of threads of the processing device is active;
   a second counter to increment with each cycle of the processing device in which both of:
      execution units of the processing device are stalled for one of the threads; and
      an access request, from the one of the threads for which the executions units are stalled, to memory external to the processing device is pending; and a power controller unit (PCU) communicably coupled to the first counter and the second counter, the PCU to:
  calculate a scalability factor from values of the first counter and the second counter, the scalability factor to indicate a first portion of a current workload of the processing device that is to be scalable to a frequency change at the processing device, and the scalability factor to determine a second portion of the current workload that is not to be scalable to the frequency change;
  determine expected performance scores of the processing device at different frequencies based on the scalability factor; and
  adjust a frequency of the processing device based on the expected performance scores of the processing device at the different frequencies.

2. The processing device of claim 1, wherein the scalability factor is calculated by subtracting the quotient of the value of the first counter and the value of the second counter from one.

3. The processing device of claim 1, wherein the current workload comprises instructions being executed by the processing device.

4. The processing device of claim 1, wherein the scalability factor is used to predict a performance change due to the frequency change at the processing device.

5. The processing device of claim 1, wherein the first counter and the second counter are part of a performance monitoring unit (PMU) of the processing device.

6. The processing device of claim 1, wherein the PCU utilizes the scalability factor as one of multiple inputs to performance optimizations performed by the PCU to adjust the frequency of the processing device.

7. The processing device of claim 1, wherein the processing device comprises multiple cores, each core comprising an instance of the first counter and the second counter.

8. A method, comprising:
  incrementing, by a processing device, a first counter with each cycle of the processing device in which at least one thread of threads of the processing device is active; and
  incrementing, by the processing device, a second counter with each cycle of the processing device in which both of:
    execution units of the processing device are stalled for one of the threads; and
    an access request, from the one of the threads for which the executions units are stalled, to memory external to the processing device is pending;
  calculating a scalability factor from values of the first counter and the second counter, the scalability factor to indicate a first portion of a current workload of the processing device that is scalable to a frequency change at the processing device;
  determining, based on the scalability factor, a second portion of the current workload that is not scalable to the frequency change;
  determining expected performance scores of the processing device at different frequencies based on the scalability factor; and
  adjusting a frequency of the processing device based on the expected performance scores of the processing device at the different frequencies.

9. The method of claim 8, wherein the scalability factor is calculated by subtracting the quotient of the value of the first counter and the value of the second counter from one.

10. The method of claim 8, wherein the scalability factor is used to predict a performance change due to adjustment of the frequency at the processing device.

11. The method of claim 10, wherein the first counter and the second counter are part of a performance monitoring unit (PMU) of the processing device, and wherein the PCU utilizes the scalability factor as one of multiple inputs to performance optimizations performed by the PCU to adjust a frequency of the processing device.

12. The method of claim 8, wherein the processing device comprises multiple cores, each core comprising an instance of the first counter and the second counter.

13. The method of claim 8, wherein the current workload comprises instructions being executed by the processing device.

14. A system comprising:
  a memory;
  a processing device communicably coupled to the memory, the processing device comprising a plurality of cores, each of the plurality of cores comprising:
    a first counter to increment with each cycle of the processing device in which at least one thread of threads of the processing device is active;
    a second counter to increment with each cycle of the processing device in which both of:
      execution units of the processing device are stalled for one of the threads; and
      an access request, from the one of the threads for which the executions units are stalled, to memory external to the processing device is pending; and
    a power controller unit (PCU) communicably coupled to the first counter and the second counter, the PCU to:
      calculate a scalability factor from values of the first counter and the second counter, the scalability factor to indicate a first portion of a current workload of the processing device that is to be scalable to a frequency change at the processing device, and the scalability factor to determine a second portion of the current workload that is not to be scalable to the frequency change;
      determine expected performance scores of the processing device at different frequencies based on the scalability factor; and
      adjust a frequency of the processing device based on the expected performance scores of the processing device at the different frequencies.

15. The system of claim 14, wherein the scalability factor is used to predict a performance change due to the frequency change at the processing device.

16. The system of claim 14, wherein the first counter and the second counter are part of a performance monitoring unit (PMU) of the processing device, and wherein the PCU utilizes the scalability factor as one of multiple inputs to performance optimizations performed by the PCU to adjust the frequency of the processing device.

17. The system of claim 14, wherein the scalability factor is calculated by subtracting the quotient of the value of the first counter and the value of the second counter from one.

18. The system of claim 14, wherein the processing device comprises multiple cores, each core comprising an instance of the first counter and the second counter.

* * * * *